United States Patent

[11] 3,542,015

| [72] | Inventor | Charles Steinman<br>Mount Vernon, New York |
|---|---|---|
| [21] | Appl. No. | 715,692 |
| [22] | Filed | March 25, 1968 |
| [45] | Patented | Nov. 24, 1970 |
| [73] | Assignees | Shirley A. Steinman<br>Mount Vernon, New York;<br>Irwin A. Steinman,<br>Staten Island, New York, co-trustees |

[54] SURGICAL RETRACTOR
5 Claims, 4 Drawing Figs.

[52] U.S. Cl. .................................................. 128/20
[51] Int. Cl. .................................................. A61b 1/00
[50] Field of Search .......................................... 128/3, 17, 20, 2, 303, 132, 132D, 294/86, 92; 272/79—83

[56] References Cited
UNITED STATES PATENTS

| 2,474,857 | 7/1949 | Newman | 128/20 |
| 2,575,204 | 11/1951 | Brown | 128/76B |
| 2,666,428 | 1/1954 | Glenner | 128/20 |
| 3,372,696 | 3/1968 | Rudie | 128/132D |

Primary Examiner—Richard A. Gaudet
Assistant Examiner—John B. Mitchell
Attorney—Edward F. Levy ABSTRACT: A self-retaining surgical retractor comprises a rake having curved fingers for engaging incision margins, a flexible cable connected at one end to the rake, and a retaining weight adaptable to be detachably connected to the other end of the cable. The rake fingers are engaged with an incision margin and the cable is draped over an adjacent downwardly sloping body surface, whereby the weight applies traction to the rake fingers which thereby retract the incision margin.

Patented Nov. 24, 1970 3,542,015

INVENTOR.
CHARLES STEINMAN

BY Edward F. Levy
ATTORNEY

SURGICAL RETRACTOR

The present invention relates to surgical instruments and more particularly to a self-retaining surgical retractor.

In surgical operations, when the surgeon makes an incision, or operates on an open wound it is necessary to maintain the incision and/or wound margins in the retracted condition to enable the surgeon to manipulate the underlying tissues and to probe within the body cavity. Presently, the surgeon requires the services of an assistant who manually operates a retractor instrument for spreading apart the incision or wound margins to facilitate the surgical procedures by the surgeon. In order to reduce the cost of surgical services as well as crowding of surgical personnel around the patient, it is desirable to eliminate the requirement for a surgical assistant to perform manual traction of the incision and wound margins.

It is therefore an object of the present invention to provide an improved and economical surgical retractor.

It is a further object of the present invention to provide a self-retaining surgical retractor which is operative to maintain incision or wound margins in the retracted condition without requiring manual manipulation thereof.

It is yet another object of the present invention to provide a self-retaining surgical retractor which is operative to provide a selectively variable retraction force to an incision margin.

In accordance with the principles of the present invention there is provided a surgical retractor comprising a rake, a flexible cable having one end thereof secured to the rake and a retaining weight adaptable to be detachably secured to the other end of the cable. Accordingly, when the rake is engaged with an incision margin and the cable is draped over an adjacent downwardly sloping body surface, the retaining weight applies traction to the incision margin thereby enabling the surgeon to manipulate the underlying tissues or to probe within the body cavity.

The features of the invention which are believed to be novel are set forth with particularity in the appended claims. The invention itself, however, both as to its organization and method of operation, together with further objects and features thereof may best be understood with reference to the following description taken in conjunction with the accompanying drawings wherein:

Figure 1:
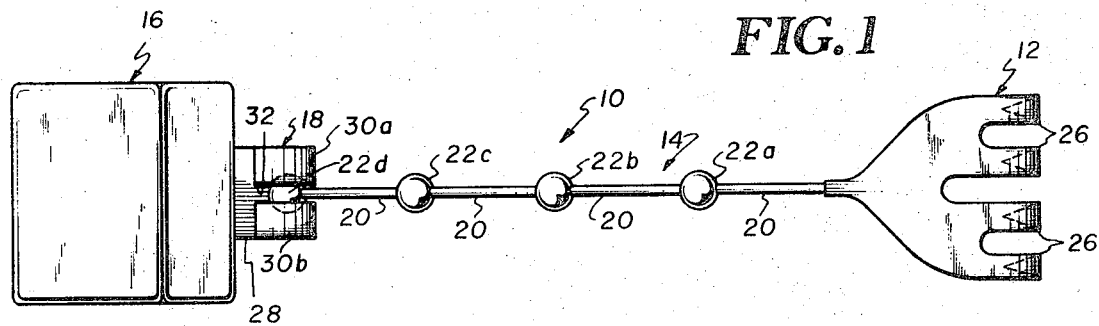
FIG. 1 is a top plan view of a surgical retractor constructed in accordance with the principles of the present invention in a preferred embodiment thereof.
Figure 2:
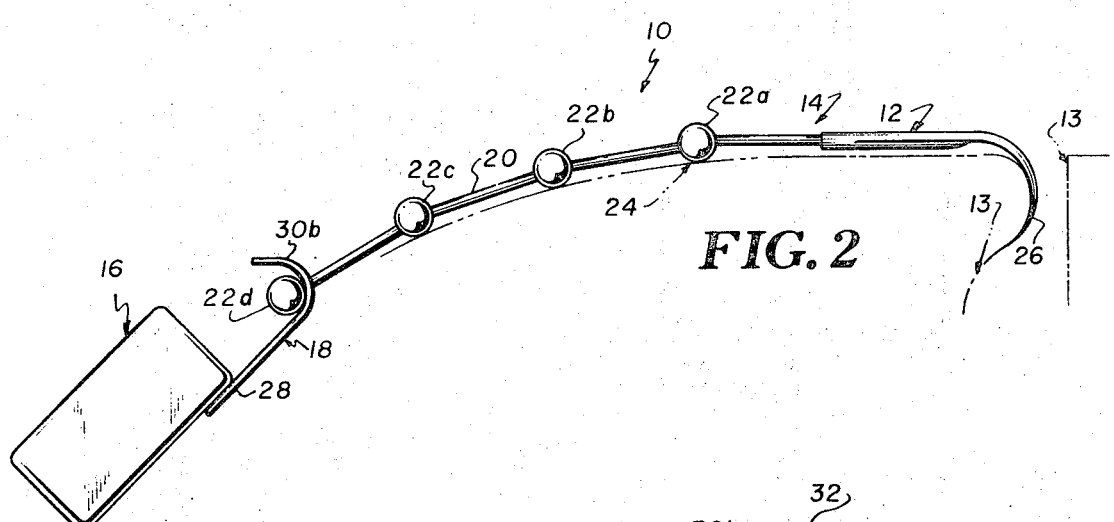
FIG. 2 is a front elevational view of the surgical retractor of FIG. 1 in the operative condition, shown draped laterally over a body surface, with the rake portion thereof projecting into the body cavity.
Figure 3:
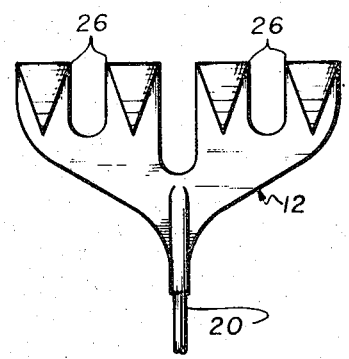
FIG. 3 is a bottom view of the rake portion of the surgical retractor of FIG. 1, shown on an enlarged scale.

Referring to the drawings and in particular to FIGS. 1 and 2, the surgical retractor 10 is shown to comprise a rake 12 fixedly connected to a flexible link cable 14 at one end thereof, and a retaining weight 16 provided with a clasp 18 for releasable connection to the other end of link cable 14.

Link cable 14 is in the form of a ball chain, and comprises a plurality of elongated, narrow links 20 respectively coupled in end-to-end relationship by a plurality of link balls 22a, 22b, 22c and 22d which are pivotally and rotatably connected to the ends of the links 20 in the usual manner to provide free flexibility to the link cable 14. The rake 12 is secured to the link 20 at one end of cable 14. The ball 22d is mounted on the free opposite end of link cable 14 for linking engagement with clasp 18, as shown in FIGS. 1 and 2. Link cable 14 may be made in varying overall lengths in order to accommodate varying body dimensions over which surgical retractor 10 is to be draped.

It is understood that link cable 14 may take various forms other than that depicted in FIGS. 1 and 2, provided that link cable 14 has sufficient flexibility to drape over the body contour surface 24 as shown in FIG. 2 when suitably weighted at its free end.

Rake 12 is provided with a plurality of longitudinally extending downwardly curved pointed hook-shaped fingers 26 of suitable length and curvature for retaining engagement with the walls of the body cavity, incision or wound margins 13 as the case may be. Rake 12 including fingers 26 may be made in varying dimensions to accommodate various sizes and contours of wounds and incisions.

Figure 4:
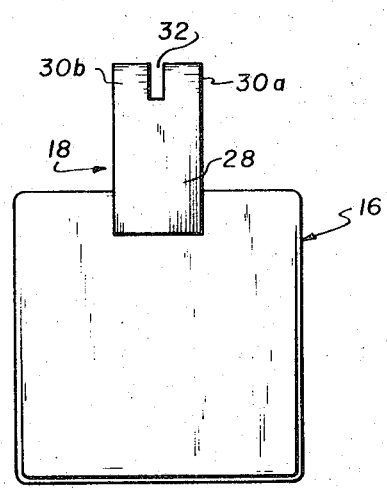
FIG. 4 is a bottom view of the retaining weight portion of the surgical retractor of FIG. 3.

As shown in FIGS. 1, 2 and 4, clasp 18 comprises a flat plate 28 suitably secured at one end to the bottom surface of weight 16, and having extending from its other end a pair of parallel spaced upwardly curved fingers 30a and 30b to define an elongated slot 32 extending along the length of fingers 30a and 30b, for slidably receiving cable 14, with ball 22d being retained by fingers 30a and 30b, in a linking arrangement as shown in FIGS. 1 and 2.

It is understood that retaining weight 16 may be selectively located at various suitable points along the length of link cable 14, other than end ball 22d, by linking clasp 18 with any one of intermediate link balls 22a, 22b or 22c. It will also be understood that the weight 16 may be readily removed from the link cable 14 for purposes of cleaning and sterilization, as well as to permit its replacement by other weights, as will be presently explained.

Although retaining weight 16 is shown in FIGS. 1 and 2 to comprise a parallelepipedal-shaped block it is understood that retaining weight 16 may take other shapes and forms which are suitable for being disposed on the body surface.

Rake 12, link cable 14, clasp 18 and retaining weight 16 may be made of various materials suitable for surgical use which are characterized by durability and ability to be sterilized in routine fashion. These parts are preferably made of metal.

In operation, one or more surgical retractors 10 may be employed to maintain the wound and/or incision margins 13 exposed, to permit the surgeon to manipulate the underlying tissues or to probe within the body cavity. Thus, in the case of an elongated incision or wound a pair of oppositely disposed surgical retractors 10 may be used, for retracting opposing incision margins 13, whereby retractor rakes 12 grasp the skin and deeper tissues while the retaining weights 16 are disposed on adjacent, downwardly-sloping portions of the body surface, thereby to accomplish retraction of the wound margins without requiring the services of an assistant to provide manual retraction.

It will be appreciated that since the weight 16 can be readily mounted upon and removed from the end of link cable 14, a plurality of heavy objects 16 of various weights may be provided for selective mounting on the cable. Thus, the weight on the cable may be selectively varied to provide the exact degree of retraction required by the particular operation.

While a preferred embodiment of the invention has been shown and described herein, it is obvious that numerous additions, changes and omissions may be made in such embodiment without departing from the spirit and scope of the invention.

I claim:

1. A surgical retractor made of a material suitable for surgical use comprising a rake with a plurality of hook-shaped fingers at one end for engaging an incision margin, a flexible cable having one end thereof secured at the other end of said rake, and a retaining weight of sufficient heaviness to hold the incision open detachably secured to the other end of said cable, whereby said weight is operative to apply traction to said incision margin when said rake is engaged with said margin and said cable is draped over an adjacent downwardly sloping body surface.

2. A surgical retractor according to claim 1 wherein said retaining weight includes a clasp operative to selectively grasp said cable at various points along the length of said cable.

3. A surgical retractor according to claim 1 wherein said rake includes a plurality of downwardly curved hook fingers extending longitudinally therefrom for engaging said incision margin.

4. A surgical retractor according to claim 2 wherein said cable includes a plurality of balls interspaced along the length of said cable, with each of said balls adaptable for linking engagement with said clasp.

5. A surgical retractor according to claim 4 wherein said clasp includes a pair of parallel upwardly curved fingers laterally spaced apart to define a slot for slidably receiving said cable, whereby one of said balls is retained by said clasp fingers thereby detachably linking said retaining weight with said cable.